(12) United States Patent
Marin et al.

(10) Patent No.: US 10,671,940 B2
(45) Date of Patent: Jun. 2, 2020

(54) CONTROLLING DISPLAY OF DATA TO A PERSON VIA A DISPLAY APPARATUS

(71) Applicant: Nokia Technologies Oy, Espoo (FI)

(72) Inventors: Janne Marin, Espoo (FI); Mika Kasslin, Espoo (FI); Lauri Laitinen, Espoo (FI); Istvan Beszteri, Espoo (FI); Olli Alanen, Vantaa (FI); Oleg Chistyakov, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/342,295

(22) PCT Filed: Oct. 26, 2017

(86) PCT No.: PCT/FI2017/050740
§ 371 (c)(1),
(2) Date: Apr. 16, 2019

(87) PCT Pub. No.: WO2018/078219
PCT Pub. Date: May 3, 2018

(65) Prior Publication Data
US 2019/0258955 A1   Aug. 22, 2019

(30) Foreign Application Priority Data
Oct. 31, 2016 (EP) ..................... 16196642

(51) Int. Cl.
*G06N 20/00* (2019.01)
*G06F 21/62* (2013.01)
*G06Q 10/00* (2012.01)
*G06Q 10/08* (2012.01)

(52) U.S. Cl.
CPC ......... *G06N 20/00* (2019.01); *G06F 21/6218* (2013.01); *G06Q 10/00* (2013.01); *G06Q 10/08* (2013.01)

(58) Field of Classification Search
CPC ........................... G06N 20/00; G06F 21/6218
See application file for complete search history.

(56) References Cited

U.S. PATENT DOCUMENTS

| 656,027 | A | 8/1900 | Kuebler |
|---|---|---|---|
| 6,434,255 | B1 | 8/2002 | Harakawa |
| 7,893,920 | B2 | 2/2011 | Endoh |

(Continued)

FOREIGN PATENT DOCUMENTS

| CN | 105354334 A | 2/2016 |
|---|---|---|
| EP | 3037916 A1 | 6/2016 |

(Continued)

OTHER PUBLICATIONS

Pero, "Magic Mirror wiith a motion detector", https://helentronica.com/2016/01/11/magic-mirror-with-motion-detector/, Jan. 2016, 13 total pages (Year: 2016).*

(Continued)

*Primary Examiner* — Alan Chen
(74) *Attorney, Agent, or Firm* — Harrington & Smith

(57) ABSTRACT

A method comprising: identifying characteristic changes in radio environment arising from a person; and using the identified characteristic changes in radio environment arising from a person to predict when a person approaches a display apparatus and to pre-fetch data for the person.

19 Claims, 2 Drawing Sheets

(56) References Cited

U.S. PATENT DOCUMENTS

| | | | |
|---|---|---|---|
| 8,337,306 | B2 | 12/2012 | Larsen et al. |
| 8,624,883 | B2 | 1/2014 | Vilcovsky |
| 8,894,209 | B2 | 11/2014 | Berry et al. |
| 8,976,160 | B2 | 3/2015 | Vilcovsky |
| 9,014,546 | B2 | 4/2015 | Shimy et al. |
| 9,060,093 | B2 | 6/2015 | Chu |
| 9,317,175 | B1 | 4/2016 | Lockhart |
| 9,387,824 | B2 | 7/2016 | Pisz et al. |
| 9,785,632 | B1 * | 10/2017 | Beaven ............... G06F 17/289 |
| 9,959,506 | B1 * | 5/2018 | Karppanen ......... G06F 16/9574 |
| 2003/0132913 | A1 | 7/2003 | Issinski |
| 2008/0049020 | A1 | 2/2008 | Gusler et al. |
| 2008/0266094 | A1 | 10/2008 | Hanebeck |
| 2008/0270579 | A1 | 10/2008 | Herz et al. |
| 2010/0153891 | A1 | 6/2010 | Vaananen et al. |
| 2010/0188426 | A1 | 7/2010 | Ohmori et al. |
| 2010/0253319 | A1 | 10/2010 | Cehelnik |
| 2011/0216060 | A1 | 9/2011 | Weising et al. |
| 2013/0145272 | A1 | 6/2013 | Boggie et al. |
| 2013/0222743 | A1 * | 8/2013 | Want ................. G02F 1/1323 349/104 |
| 2014/0085178 | A1 | 3/2014 | Kokkosoulis et al. |
| 2014/0104168 | A1 | 4/2014 | Hegde |
| 2014/0184494 | A1 | 7/2014 | Burachas |
| 2014/0191965 | A1 | 7/2014 | Rigley |
| 2014/0223326 | A1 | 8/2014 | Mantripragada et al. |
| 2015/0009130 | A1 | 1/2015 | Motta et al. |
| 2015/0134572 | A1 * | 5/2015 | Forlines ............... G06F 3/041 706/11 |
| 2015/0198709 | A1 * | 7/2015 | Inoue .................. G01S 13/28 342/147 |
| 2015/0220931 | A1 | 8/2015 | Alsina et al. |
| 2015/0281395 | A1 * | 10/2015 | Pandiarajan ......... H04L 67/322 709/219 |
| 2015/0312839 | A1 * | 10/2015 | Trehan ............... H04W 40/244 370/338 |
| 2016/0055758 | A1 | 2/2016 | Francis |
| 2016/0255475 | A1 * | 9/2016 | Maguire .............. H01Q 1/245 455/456.3 |
| 2016/0364634 | A1 * | 12/2016 | Davis ................ G06K 9/78 |
| 2017/0046568 | A1 * | 2/2017 | Bulzacki ............. G06F 3/017 |
| 2017/0090585 | A1 * | 3/2017 | Bernhart ............. G06F 3/005 |
| 2017/0178012 | A1 * | 6/2017 | Borza ............... G06F 16/9574 |
| 2017/0200009 | A1 * | 7/2017 | Bertolet ............. G06F 21/575 |
| 2018/0032997 | A1 * | 2/2018 | Gordon ............. G06Q 20/3224 |
| 2019/0158994 | A1 * | 5/2019 | Gross ................ H04W 4/025 |

FOREIGN PATENT DOCUMENTS

| | | | | |
|---|---|---|---|---|
| EP | 3115870 | A1 | 1/2017 | |
| EP | 3316117 | A1 | 5/2018 | |
| JP | 2005132189 | A * | 5/2005 | ......... B60R 21/0136 |
| JP | 2007507782 | A * | 3/2007 | ............ G06F 3/038 |
| JP | 2009110122 | A * | 5/2009 | ............ G06F 13/00 |
| JP | 2013065248 | A * | 4/2013 | ........... G06F 16/487 |
| JP | 2015114755 | A * | 6/2015 | ............ G06Q 30/02 |
| JP | 2016057354 | A * | 4/2016 | ............ G09B 29/00 |
| WO | 2005/071656 | A1 | 8/2005 | |
| WO | 2013/154295 | A1 | 10/2013 | |
| WO | 2013/190538 | A1 | 12/2013 | |
| WO | 2015/199827 | A1 | 12/2015 | |
| WO | 2016/011713 | A1 | 1/2016 | |
| WO | 2016/040089 | A1 | 3/2016 | |

OTHER PUBLICATIONS

"Get Ready to See More Than Yourself in the Mirror", Slice of Lime, Retrieved on Apr. 2, 2019, Webpage available at : http://www.sliceoflime.com/see-more-than-yourself-in-mirror/.

Banerjee et al., "Mouse Control Using a Web Camera Based on Colour Detection", International Journal of Computer Trends and Technology (IJCTT), vol. 9, No. 1, Mar. 2014, pp. 15-20.

Park, "A Method for Controlling Mouse Movement Using a Real-time Camera", Thesis, Jan. 2008, pp. 1-11.

"Behind Microsoft's magic mirror: Raspberry Pi, AI, Windows IoT plus Azure", ZDNet, Retrieved on Apr. 15, 2019, Webpage available at : https://www.zdnet.com/article/behind-microsofts-magic-mirror-raspberry-pi-ai-windows-iot-plus-azure/.

Yuan, "Using Large-size 2D Displays to Create 3D Hyper-Realistic See-Through Experiences", The Processing of 16th International Display Workshops, Jan. 2009, 4 pages.

"Technology Behind Smart Bathroom Mirrors", Boston Commons High Tech Network, Retrieved on Jul. 22, 2016, Webpage available at : http://www.bostoncommons.net/technology-behind-smart-bathroom-mirrors/.

Extended European Search Report received for corresponding European Patent Application No. 16196642.9, dated Dec. 13, 2016, 9 pages.

Partial European Search Report received for corresponding European Patent Application No. 16196640.3, dated Apr. 21, 2017, 11 pages.

Extended European Search Report received for corresponding European Patent Application No. 16196640.3, dated Jul. 26, 2017, 11 pages.

International Search Report and Written Opinion received for corresponding Patent Cooperation Treaty Application No. PCT/FI2017/050740, dated Dec. 19, 2017, 13 pages.

International Search Report and Written Opinion received for corresponding Patent Cooperation Treaty Application No. PCT/FI2017/050730, dated Mar. 19, 2018, 16 pages.

Office action received for corresponding European Patent Application No. 16196642.9, dated Nov. 21, 2018, 5 pages.

* cited by examiner

US 10,671,940 B2

CONTROLLING DISPLAY OF DATA TO A PERSON VIA A DISPLAY APPARATUS

RELATED APPLICATION

This application was originally filed as PCT Application No. PCT/FI2017/050740 filed Oct. 26, 2017 which claims priority benefit from EP Application No. 16196642.9, filed Oct. 31, 2016.

TECHNOLOGICAL FIELD

Embodiments of the present invention relate to controlling display of data to a person via a display apparatus.

BACKGROUND

It is desirable to display data to a person via a display apparatus.

BRIEF SUMMARY

According to various, but not necessarily all, embodiments of the invention there is provided a method comprising: identifying characteristic changes in radio environment arising from a person; and using the identified characteristic changes in radio environment arising from a person to predict when a person approaches a display apparatus and to pre-fetch data for display to the person via the display apparatus.

In some examples, the characteristic changes in radio environment arising from a person depend upon electrical properties of the person.

In some examples, the step of identifying characteristic changes in radio environment arising from a person does not involve tracking an electronic device or identifying characteristic changes in radio environment arising from an electronic device.

In some examples, using the identified characteristic changes in radio environment arising from a person to predict when a person approaches a display apparatus and to pre-fetch data for the person comprises using the identified characteristic changes in radio environment arising from a person to predict when a particular person approaches the display apparatus and pre-fetch data for that particular person.

In some examples, the method comprises receiving radio environment data over an extended period of time and performing temporal pattern recognition in the received radio environment data to identify characteristic changes in radio environment arising from a person.

In some examples, the method comprises recording events comprising one or more radio environment events, detecting arrival of a person at the display apparatus, and using a combination of the recorded events comprising one or more radio environment events that are recorded prior to the arrival of the person, as a learning input to a machine learning algorithm for predicting when a person is approaching the display apparatus.

In some examples, the method comprises: recording events comprising one or more radio environment events; and using a combination of recorded events comprising one or more radio environment events as an input to a machine learning algorithm for predicting that a person is approaching with a defined level of confidence. In some examples, the method comprises, comprising after predicting when a person is approaching the display apparatus, either detecting arrival of a person and adjusting the algorithm to increase a level of confidence for a subsequent prediction or determining that a person does not arrive and adjusting the algorithm to decrease the level of confidence for a subsequent prediction.

In some examples, the recorded events additionally comprise one or more of: time of day, day of week and schedule of one or more a persons.

In some examples, the pre-fetched data is data for display to the person via the display apparatus.

In some examples, authentication of the person is performed before display of pre-fetched data to that person via the display apparatus.

In some examples, the method is performed only when a connection bandwidth for obtaining data for display is below a threshold value.

In some examples, the display apparatus is a bathroom mirror comprising a display and a one-way mirror, wherein the display apparatus operates as a mirror in the absence of the display displaying data and wherein data is displayed through the mirror when the display displays data.

In some examples, an apparatus comprises means for performing the method.

In some examples, a computer program when loaded into a processor enables the method.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

It is desirable to be able to present data to a user that is up to date. It may also be desirable to present data to a user that is personal to that user.

However, this presents a number of challenges such as deciding what data to present and when and for how long to present it.

It may be problematic to determine what data to present, determine if and when it should be presented, and then obtain current data and present the current data within a time period that provides the user of the display with a satisfactory user experience.

This is particularly so where it is desirable for a display apparatus to display relevant data to a person automatically and immediately when a person arrives at a display apparatus, rather than requiring the user to interact with the display apparatus or to wait at the display apparatus until data is obtained.

One application in which it is foreseen that this automatic and immediate presentation of up-to-data will be particularly useful, is in a "smart mirror", for example a smart mirror in a bathroom, which may display relevant personal data to a user (and not to other users) when the relevant user approaches the bathroom mirror and then remove the displayed data when that person has moved away from the bathroom mirror. In this way, personal data, even medical or health information, may be securely displayed to a user automatically and without the user having to wait for the display apparatus to display the data.

Figure 1:
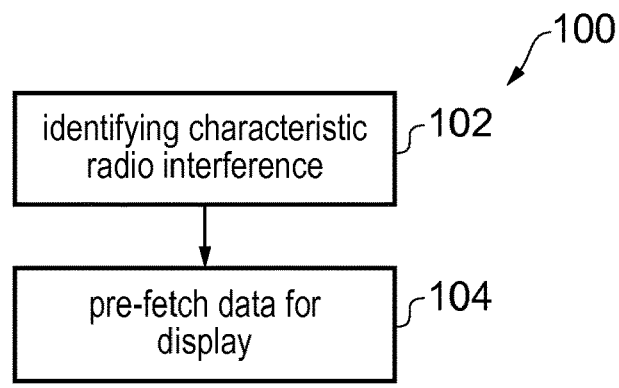
FIG. 1 illustrates an example of a method for pre-fetching data for display.

FIG. 1 illustrates an example of a method 100 for controlling display of data to a user.

Figure 2:
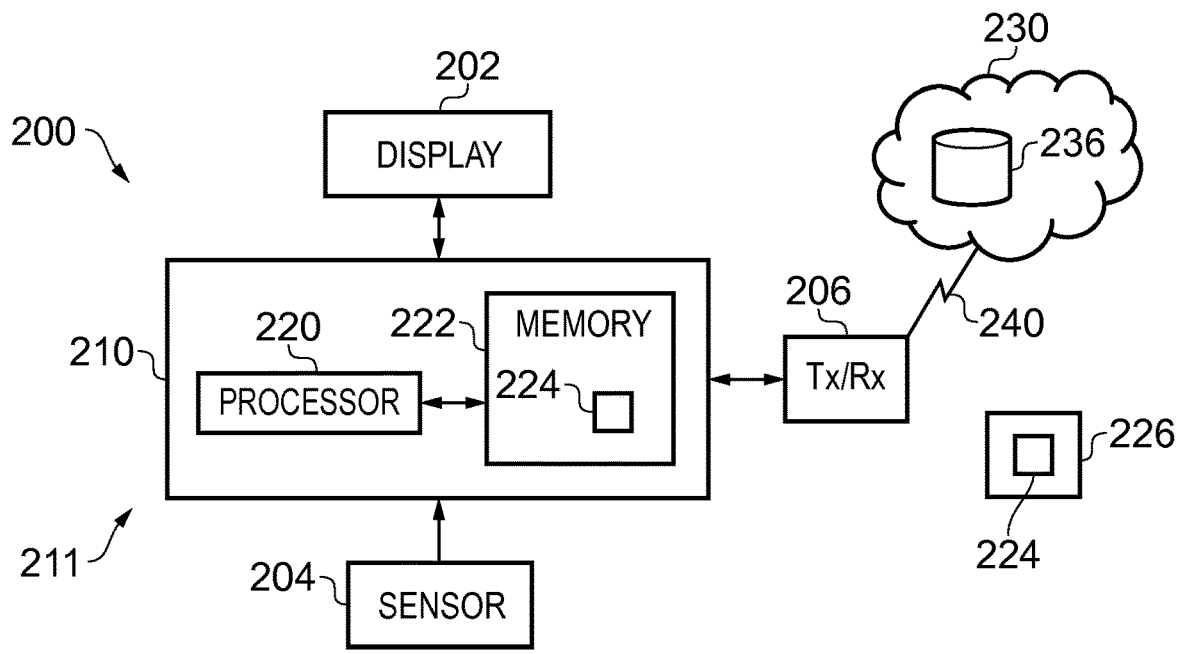
FIG. 2 illustrates an apparatus suitable for performing the method of FIG. 1.
Figure 3:
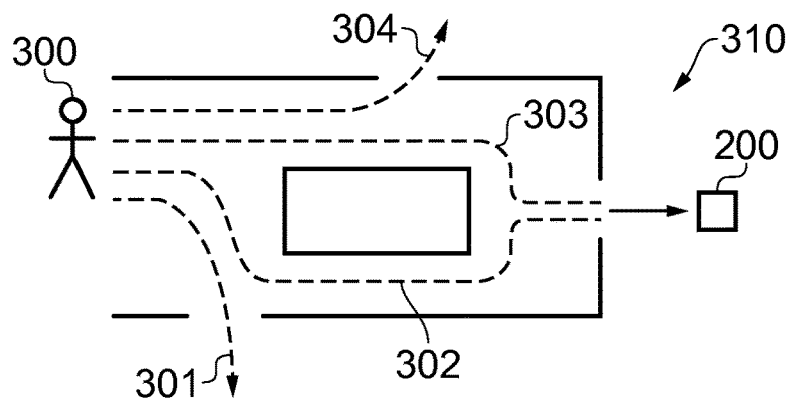
FIG. 3 illustrates an environment in which the apparatus of FIG. 2 may be used.

FIG. 2 illustrates an example of an apparatus 200 comprising a display apparatus 202 which is configured to perform the method 100. FIG. 3, illustrates an example of an environment 310 in which an apparatus 200 suitable for performing the method 100 is approached by a person 300.

Referring to FIG. 1, at block 102, the method 100 comprises identifying characteristic changes in radio environment arising from a person 300. At block 104, the method 100 then comprises using the identified characteristic changes in radio environment arising from a person 300 to predict when a person 300 approaches a display apparatus 202 and to pre-fetch data for the person 300.

In some but not necessarily all examples, the method 100 at block 102, comprises identifying characteristic radio interference arising from the person 300 and, at block 104, comprises using the identified characteristic radio interference arising from a person 300 to predict when a person 300 approaches a display apparatus 202 and to pre-fetch data for the person 300.

In some but not necessarily all examples, the pre-fetched data is for display to the person 300 via the display apparatus.

In some but not necessarily all examples, the pre-fetched data is additionally or alternatively for authenticating a person 300.

As illustrated in FIG. 3, a person 300 may approach the apparatus 200 via different routes 301, 302, 303, 304 within the environment 310. In this example, at an early stage in the routes, all of the routes 301, 302, 303, 304 appear to be potentially approaching the apparatus 200. At a later stage in the routes, the routes 301 and 304 have diverted to different destinations other than the apparatus 200 and only the routes 302 and 303 are routes that actually reach, as their destination, the apparatus 200.

The method 100 by identified characteristic changes in radio environment arising from the person 300 is able to disambiguate whether the person 300 is approaching the apparatus 200 along a route that has (or is likely to have) the apparatus 200 as a destination (routes 302, 303) or has diverted to a different destination (routes 301, 304). The apparatus 200, by using the identified characteristic changes in radio environment arising from the person 300, is able to predict when a person 300 approaches the display apparatus 200 and is able to pre-fetch data for display to the person via a display apparatus 202.

At the early stage of all the routes, the person 300 is approaching the apparatus 200 and in some implementations this may be sufficient to cause the pre-fetching of data for display to the person via the display apparatus. However, the display of the pre-fetched data may be delayed, for example until the apparatus 200 has made a further detection such that there is an increased level of confidence that the person 300 is not only approaching the apparatus 200 but has the apparatus 200 or its local environment as a destination.

In other implementations, the pre-fetching of data may be delayed until the person 300 approaches the local environment of the apparatus 200 more closely. In this scenario, the data may not be pre-fetched for routes 301 and 304 at all but may be pre-fetched for routes 302 and 303 as the user moves towards the apparatus 200 and there is therefore an increased confidence level that the person 300 has, as their destination, the apparatus 200 or a local environment to the apparatus 200 as a destination. However, again, in this implementation the display of the pre-fetched data may be delayed until the person 300 is actually in front of the display apparatus 202.

Figure 4:
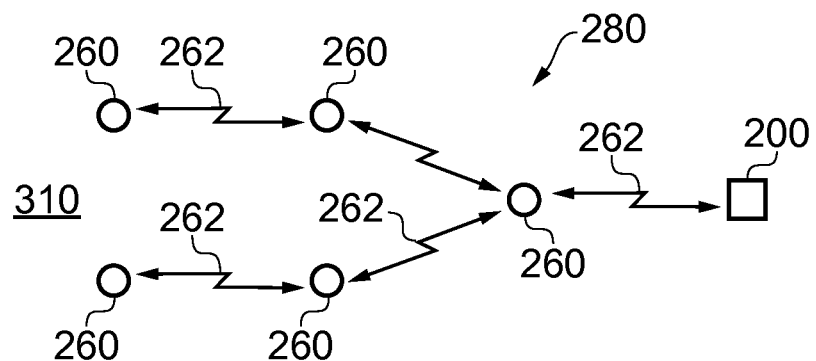
FIG. 4 illustrates a sensor arrangement for use with the apparatus of FIG. 2.
Figure 5:
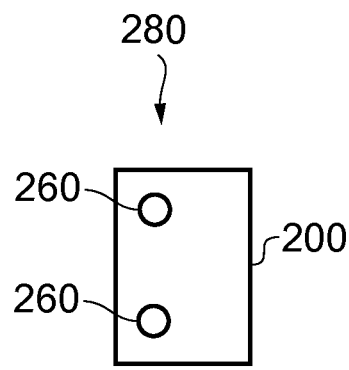
FIG. 5 illustrates a sensor arrangement integrated with the apparatus of FIG. 2.

The characteristic changes in radio environment arising from a person 300 may, for example, depend upon electrical properties of the person 300. The electrical properties of the person change the electrical properties of the space in which the person is located and this change in electrical properties of the space may, for example, be detected using a sensor arrangement 200, for example, as illustrated in FIGS. 4 and 5.

The identifying of characteristic changes in radio environment arising from a person does not involve tracking of an electronic device carried by the person or identifying characteristic changes in radio environment arising from an electronic device carried by the person, but rather identifies characteristic changes in radio environment arising from the person 300 themselves.

As described above, it may be desirable to have an additional condition that is fulfilled before pre-fetched data is displayed on a display apparatus 202. In some circumstances, this may be a proximity detection event that detects the presence of a person in the local environment of the apparatus 200. However, in other implementations, there may be an authentication procedure to ensure that the pre-fetched data, which may be personal data, is not displayed to an incorrect person.

The method 100 may therefore comprise authentication of a person before display of the pre-fetched data to that person via the display apparatus 202. It is preferable for the authentication procedure to be automatic without requiring user interaction. For example, one method of authentication may be face recognition. Algorithms for face recognition are known and typically involve using computer vision to process an image of a person to: identify a face, then analyze the portion of the image that relates to the face to identify facial parameters, and then use some form of analysis, for example, principle component analysis, to relate a determined unique combination of facial parameters that specify a particular face to a record that identifies the person. The pre-fetched data will also comprise a person identifier and if there is correspondence between the identification of the person via face recognition and the person as identified in metadata of the pre-fetched data, then authentication is confirmed and the pre-fetched data is displayed. However, if the identity of the person determined via face recognition does not match the identity of the person as identified in the metadata of the pre-fetched data then the authentication process fails and the pre-fetched data is not displayed.

In some examples, the method 100 may be configured to pre-fetch data for all potential users of the apparatus 100 when the approach of any person has been detected/predicted. Alternatively, in other implementations, it may be possible to disambiguate, with confidence, between individual users by identifying characteristic changes in radio environment arising from a person, the distinguishing characteristic changes in radio environment arising from that particular person may then be used to predict when that particular person approaches the display apparatus 202 and may be used to pre-fetch data for that particular person (and no other person) for display to that particular person via the display apparatus 202.

In order to detect when a person or a particular person is approaching the display apparatus 202, the method 100 may comprise collecting radio environment data over an extended period of time and then performing temporal pattern recognition of contemporaneously received radio environment data to identify changes in radio environment arising from a person contemporaneously. This enables the method 100 to use contemporaneous temporal pattern recognition to predict when a person or a particular person approaches the display apparatus 202 and to pre-fetch data for display.

FIG. 2 illustrates an example of an apparatus 200 suitable for performing the method 100. The apparatus 200 comprises a controller 211, a display apparatus 202, a communication interface 206 and a sensor interface 204.

The controller 211 is configured to cause detection of an identification event when radio environment data provided by the sensor interface 204 indicates that a person 300 is approaching the display apparatus 200. This enables identifying characteristic changes in radio environment arising from the person 300.

Although in this example, the communications interface 206 and the sensor interface 204 are illustrated as separated interfaces, in other examples, a single interface may perform both functions simultaneously.

The controller 211 then causes the pre-fetching of data for display to the approaching person via the display apparatus 202. In this way, the controller 211 uses the identified characteristic changes in radio environment arising from a person 300 to predict when a person approaches a display apparatus 202 and to pre-fetch data for display to the person 300 via the display apparatus 202.

As previously described, the controller 211 may be configured to request the pre-fetching of all relevant data when the approach of a person is detected or the controller 211 may be configured to disambiguate the sensor data and to identify a particular person and request the pre-fetching of data for that particular person.

The pre-fetching of data is achieved, in this example, via the communications interface 206 which communicates via a communication link 240 with a remote database 232 which is part of a remote network 230.

In this example, the controller 211 uses the communication interface 206 to request data from the remote database 232. The remote database 232 responds by providing the data via the communication interface 206 to the controller 211. The controller 211 then causes the display apparatus 202 to display the received data when conditions for displaying the data are fulfilled. As previously described, these conditions may require the detection that a person is in the local environment to the display apparatus 202 and/or may require the authentication of a particular person via, for example, face recognition. In the latter example, a camera will be required which will provide data to the controller 211 via the sensor interface 204.

In some, but not necessarily all, examples the controller 211 may be configured to conditionally pre-fetch data for display. For example, the controller 211 may pre-fetch data for a person only when the controller 211 detects that the communication link 240 between the communication interface 206 and the database 232 is insufficient to quickly download data to the controller 211 for display. That is, in some circumstances, the controller 211 may be configured to always perform the method 100 illustrated in FIG. 1 and in some other implementations, the controller 211 may only be configured to perform the method 100 illustrated in FIG. 1 when there is a likelihood, arising from the slow speed of the communication link 240, or otherwise, that there will be a delay in the obtaining and display of data to a person when they are in front of the display apparatus 202.

The controller 211 may, for example, use a threshold value for the connection bandwidth of the communication link 240 and only perform the method 100 as illustrated in FIG. 1, when a connection bandwidth for obtaining the data for display is below the threshold value.

The controller 211 may, in some, but not necessarily all, examples be configured to execute machine learning so that it improves its ability to identify a person from radio environment data provided via the sensor interface 204.

For example, the controller 211 may be configured to record events comprising one or more radio environment events and configured to detect arrival of a person at the display apparatus 202. The controller 211 may then be configured to use a combination of the recorded events comprising one or more interference events that are recorded prior to arrival of the person, as a learning input to a machine learning algorithm for predicting when a person is approaching. Typically, machine learning algorithms receive interference data from the sensor interface 204, process the received data to identify interference events and then detect the presence of a person (or a particular person) with a particular level of confidence. If the machine learning algorithm predicts that a person is approaching with a certain level of confidence, and the machine learning algorithm is correct because there is a subsequent detection of the arrival of a person, then the machine learning algorithm has a 'hit' and it is adjusted to increase the level of confidence for a subsequent prediction based on the same input data. If, however, the machine learning algorithm has a 'miss' and is incorrect in detecting the arrival of a person, then the machine learning algorithm is adjusted to decrease the level of confidence for a subsequent prediction of arrival of a person using the same input data.

In some examples, but not necessarily all examples, the learning algorithm may be supplemented with additional data such as, for example, the time of day, day of the week, and/or a schedule for a particular person. In this way, the learning algorithm can intelligently take into account the likelihood that a person will be approaching the display apparatus 202.

The implementation of a machine learning algorithm is possible, for example, by using a neural network or, for example, a hidden Markov model.

FIGS. 4 and 5 illustrate different sensor arrangements 280 that are configured to sense changes in radio environment arising from a person. This radio environment data is provided as sensor data to the sensor interface 204 of the apparatus 200.

In this example, the different sensor arrangements 280 are configured to sense changes in radio interference arising from a person. This radio interference data is provided as sensor data to the sensor interface 204 of the apparatus 200.

The sensor arrangements 280 comprise one or more sensors 260. Typically, the sensors 260 have spatial diversity in that they are separated in space so that there is some spatial resolution of the radio environment data collected by the sensors 260. The sensors 260 may, for example, be radio antenna apparatus that, in combination with the environment 310, form an impedance network at radio frequencies. The approach of a person 300 with electrical properties into this network will cause a change in the impedance characteristics of that network which can be detected as a change in impedance, for example. In this way, it is possible to collect radio environment data arising from the person 300. This radio environment data depends upon the electrical properties of the person and how they interfere with the existing impedance network.

In the example of FIG. 4, the sensor arrangement 280 is a distributed arrangement that comprises sensors 260 distributed throughout the environment 310. In actual implementations, there may be more or less sensors than the number of sensor illustrated in the figure. In this example, the individual sensors 260 are configured to communicate 262 between each other and ultimately with the apparatus 200 via the sensor interface 204. In this example, the sensors 260 are arranged to communicate as a daisy chain from one to the other to a node which is also a sensor which then communicates with the sensor interface 204. However, in other examples, the sensor interface 204 may be a central node with each of the sensors 260 individually communicating directly with the sensor interface 204.

In the example of FIG. 5, the sensor arrangement 280 comprises sensors 260 which are integrated within the apparatus 200 and, in this example, are integrated within the display apparatus 202.

It should be appreciated that while the sensors 260 illustrated in FIG. 5 are also radio environment sensors, the sensor arrangement 280 may additionally or alternatively comprise, within the apparatus 200, proximity sensors that are used to detect the presence of a person or a particular person very close to the display apparatus 202.

In other examples, the sensor arrangement 280 comprises sensors 260 which are integrated within the apparatus 200 and sensors 260 distributed throughout the environment 310.

Figure 6:
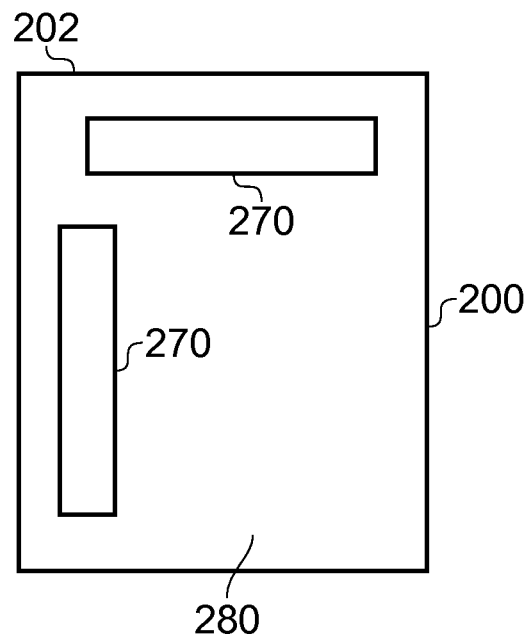
FIG. 6 illustrates display of data on a display apparatus.

FIG. 6 illustrates a display apparatus 202 that is displaying pre-fetched data 270. As previously described, the conditions for obtaining the pre-fetched data 270 are that a person who is approaching the apparatus 200 is detected using changes in radio environment. There may additionally be conditions that control when the pre-fetched data 270 is displayed, for example, based upon the detection of a person (or a particular person) close to the display apparatus 200. There may also be conditions that determine when the data 270 is no longer displayed by the display apparatus 202. For example, it may only be displayed for a limited duration or display of the data 270 may stop when it is detected that a person who was previously in front of the display apparatus 202 is no longer in front of the display apparatus 202.

In the example of FIG. 6, the display apparatus 202 is a mirror, for example a bathroom mirror, comprising a display (not seen in the Figure) and a one-way mirror 280. The one-way mirror 280 is in front of the display. When the display is not displaying data 270, the display apparatus 202 operates as a mirror. When the display displays the pre-fetched data 270, this pre-fetched data can be seen through the mirror 280 in those areas where it is displayed.

Referring back to FIG. 2, implementation of a controller 211 may be as controller circuitry. The controller 211 may be implemented in hardware alone, have certain aspects in software including firmware alone or can be a combination of hardware and software (including firmware).

As illustrated in FIG. 2 the controller 211 may be implemented using instructions that enable hardware functionality, for example, by using executable instructions of a computer program 224 in a general-purpose or special-purpose processor 220 that may be stored on a computer readable storage medium (disk, memory etc) to be executed by such a processor 220.

The processor 220 is configured to read from and write to the memory 222. The processor 220 may also comprise an output interface via which data and/or commands are output by the processor 220 and an input interface via which data and/or commands are input to the processor 220.

The memory 222 stores a computer program 224 comprising computer program instructions (computer program code) that controls the operation of the apparatus 200 when loaded into the processor 220. The computer program instructions, of the computer program 224, provide the logic and routines that enables the apparatus to perform the method 100, for example, as illustrated in FIG. 1. The processor 220 by reading the memory 222 is able to load and execute the computer program 224.

The apparatus 200 therefore comprises:
at least one processor 220; and
at least one memory 222 including computer program code
the at least one memory 222 and the computer program code configured to, with the at least one processor 220, cause the apparatus 200 at least to perform:
identifying characteristic changes in radio environment arising from a person; and
using the identified characteristic changes in radio environment arising from a person to predict when a person approaches a display apparatus and to pre-fetch data for display to the person via the display apparatus.

As illustrated in FIG. 2, the computer program 224 may arrive at the apparatus 200 via any suitable delivery mechanism 226. The delivery mechanism 226 may be, for example, a non-computer-readable storage medium, a computer program product, a memory device, a record medium such as a compact disc read-only memory (CD-ROM) or digital versatile disc (DVD), an article of manufacture that tangibly embodies the computer program 224. The delivery mechanism may be a signal configured to reliably transfer the computer program 224. The apparatus 200 may propagate or transmit the computer program 224 as a computer data signal.

Although the memory 222 is illustrated as a single component/circuitry it may be implemented as one or more separate components/circuitry some or all of which may be integrated/removable and/or may provide permanent/semi-permanent/dynamic/cached storage.

Although the processor 220 is illustrated as a single component/circuitry it may be implemented as one or more separate components/circuitry some or all of which may be integrated/removable. The processor 220 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIG. 1 may represent steps in a method and/or sections of code in the computer program 224. The illustration of a particular order to the blocks does not necessarily imply that there is a required or preferred order for the blocks and the order and arrangement of the block may be varied. Furthermore, it may be possible for some blocks to be omitted.

The interconnection of features in a figure does not necessarily mean that the features are connected or directly connected. They may be operationally coupled and any number or combination of intervening elements can exist (including no intervening elements)

Where a structural feature has been described, it may be replaced by means for performing one or more of the functions of the structural feature whether that function or those functions are explicitly or implicitly described.

For example, the apparatus 200 comprises means for identifying characteristic changes in radio environment arising from a person; and means for using the identified characteristic changes in radio environment arising from a person to predict when a person approaches a display apparatus and to pre-fetch data for display to the person via the display apparatus.

As used here 'module' refers to a unit or apparatus that excludes certain parts/components that would be added by an end manufacturer or a user. The apparatus 200, the controller 211 and/or the display apparatus 202 may be modules.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one processor; and
   at least one non-transitory memory including computer program code;
   the at least one memory and the computer program code configured to, with the at least one processor, cause the apparatus at least to perform:
   identifying, by the at least one processor, characteristic changes in radio environment arising in accordance with behaviors of a person detected by a plurality of sensors; and using, by the at least one processor, the identified characteristic changes in radio environment to predict when the person approaches a display apparatus and to pre-fetch data for the person;
   recording events comprising one or more radio environment events;
   using a combination of the recorded events comprising the one or more radio environment events as an input to a machine learning algorithm for predicting with a defined level of confidence that the person is approaching the display apparatus;
   after predicting when the person is approaching the display apparatus, either detecting arrival of a person at the display apparatus and adjusting the algorithm to increase the level of confidence for a subsequent prediction based on the arrival of the person at the display apparatus and further based on the combination of the recorded events comprising the one or more radio environment events, or determining that a person does not arrive at the display apparatus and adjusting the algorithm to decrease the level of confidence for a subsequent prediction based on that the person does not arrive at the display apparatus and further based on the combination of the recorded events comprising the one or more radio environment events.

2. An apparatus as claimed in claim 1, wherein the characteristic changes in radio environment arising from a person depends upon electrical properties of the person.

3. An apparatus as claimed in claim 1, wherein identifying characteristic changes in radio environment arising from a person does not involve tracking an electronic device or identifying characteristic changes in radio environment arising from an electronic device.

4. An apparatus as claimed in claim 1, wherein the at least one memory and the computer program code are further configured to, with the at least one processor, cause the apparatus at least to perform: using the identified characteristic changes in radio environment arising from a person to predict when a particular person approaches the display apparatus and pre-fetch data for that particular person.

5. An apparatus as claimed in claim 1, wherein the at least one memory and the computer program code are further configured to, with the at least one processor, cause the apparatus at least to perform: receiving radio environment data over an extended period of time and performing temporal pattern recognition in the received radio environment data to identify characteristic changes in radio environment arising from a person.

6. An apparatus as claimed in claim 1, wherein the at least one memory and the computer program code are further configured to, with the at least one processor, cause the apparatus at least to perform: recording events comprising one or more radio environment events, detecting arrival of a person at the display apparatus, and using a combination of the recorded events comprising one or more radio environment events that are recorded prior to the arrival of the person, as a learning input to a machine learning algorithm for predicting when a person is approaching the display apparatus.

7. An apparatus as claimed in claim 6, wherein the recorded events additionally comprise one or more of: time of day, day of week and schedule of one or more a persons.

8. An apparatus as claimed in claim 1, wherein the pre-fetched data is data for display to the person via the display apparatus.

9. An apparatus as claimed in claim 8, wherein the at least one memory and the computer program code are further configured to, with the at least one processor, cause the apparatus at least to perform: authentication of the person before displaying pre-fetched data to that person via the display apparatus.

10. An apparatus as claimed in claim 1, wherein the changes in the radio environment are detected by a plurality of spatially separated sensors configured to form a radio frequency impedance network having electrical properties that are changed by movement of a person relative to the sensors.

11. The apparatus as claimed in claim 1, wherein the recorded events additionally comprise one or more schedule events of the person.

12. A method comprising:
identifying, by at least one processor, characteristic changes in radio environment arising in accordance with behaviors of a person detected by a plurality of sensors; and using, by the at least one processor, the identified characteristic changes in radio environment to predict when the person approaches a display apparatus and to pre-fetch data for the person;
recording events comprising one or more radio environment events;
using a combination of the recorded events comprising the one or more radio environment events as an input to a machine learning algorithm for predicting with a defined level of confidence that the person is approaching the display apparatus;
after predicting when the person is approaching the display apparatus, either detecting arrival of a person at the display apparatus and adjusting the algorithm to increase the level of confidence for a subsequent prediction based on the arrival of the person at the display apparatus and further based on the combination of the recorded events comprising the one or more radio environment events, or determining that a person does not arrive at the display apparatus and adjusting the algorithm to decrease the level of confidence for a subsequent prediction based on that the person does not arrive at the display apparatus and further based on the combination of the recorded events comprising the one or more radio environment events.

13. A method as claimed in claim 12, wherein the method is performed when a connection bandwidth for obtaining data for display is below a threshold value.

14. A method as claimed in claim 12, wherein the display apparatus is a mirror comprising a display and a one-way mirror, wherein the display apparatus operates as a mirror in the absence of the display displaying data and wherein data is displayed through the mirror when the display displays data.

15. A method as claimed in claim 12, wherein the characteristic changes in radio environment arising from a person depends upon electrical properties of the person.

16. A method as claimed in claim 12, wherein identifying characteristic changes in radio environment arising from a person does not involve tracking an electronic device or identifying characteristic changes in radio environment arising from an electronic device.

17. A method as claimed in claim 12, wherein using the identified characteristic changes in radio environment arising from a person to predict when a person approaches a display apparatus and to pre-fetch data for the person comprises using the identified characteristic changes in radio environment arising from a person to predict when a particular person approaches the display apparatus and pre-fetch data for that particular person.

18. A method as claimed in claim 12, wherein the changes in the radio environment are detected by a plurality of spatially separated sensors configured to form a radio frequency impedance network having electrical properties that are changed by movement of a person relative to the sensors.

19. A non-transitory computer readable medium comprising program instructions stored thereon to cause performing of at least the following:
identifying, by at least one processor, characteristic changes in radio environment arising in accordance with behaviors of a person detected by a plurality of sensors; and using, by the at least one processor, the identified characteristic changes in radio environment to predict when the person approaches a display apparatus and to pre-fetch data for the person;
recording events comprising one or more radio environment events;
using a combination of the recorded events comprising the one or more radio environment events as an input to a machine learning algorithm for predicting with a defined level of confidence that the person is approaching the display apparatus;
after predicting when the person is approaching the display apparatus, either detecting arrival of a person at the display apparatus and adjusting the algorithm to increase the level of confidence for a subsequent prediction based on the arrival of the person at the display apparatus and further based on the combination of the recorded events comprising the one or more radio environment events, or determining that a person does not arrive at the display apparatus and adjusting the algorithm to decrease the level of confidence for a subsequent prediction based on that the person does not arrive at the display apparatus and further based on the combination of the recorded events comprising the one or more radio environment events.

\* \* \* \* \*